United States Patent Office 2,909,504
Patented Oct. 20, 1959

2,909,504

RUBBER ANTIOXIDANTS

Ronald B. Spacht, Franklin Township, Portage County, Ohio, assignor to The Goodyear Tire & Rubber Company, Akron, Ohio, a corporation of Ohio No Drawing. Application March 26, 1957
Serial No. 648,515

10 Claims. (Cl. 260—45.95)

This invention relates to the preservation of rubber, and more particularly to the provision and use of a new class of age resistors for rubber.

Rubber is subject to deterioration from many sources such as sunlight, ozone, atmospheric oxygen, presence of heavy metals, etc. Both cured and uncured natural and synthetic elastomers are subject to deterioration. Deterioration in cured stock may likewise vary with the type of stock, the state of cure, the amount of surface exposed and the temperature at which the rubber is being used. An ideal antioxidant would be one which would protect rubber from deterioration regardless of kind, in the cured or uncured state no matter where used. Since no such antioxidant has been discovered compromises must be made in the selection of an antioxidant for use in rubber.

Certain alkylated phenols have been found to be effective antioxidants. While many of these phenols have displayed antioxidant activity, there is a very great difference between phenols as to their effectiveness as age resistors. The effectiveness of a phenolic antioxidant will vary with the type of groups present and the location of the substituent groups. Furthermore, the vapor pressure of the phenolic molecule is of particular importance for certain usages, i.e. for high temperature uses and for uses wherein large rubber surfaces are exposed. Again compromises may have to be made. A good antioxidant may be too volatile for general usage while on the other hand a nonvolatile material may be a poor antioxidant.

According to the present invention, a class of phenols has been discovered which exhibit unusual and unexpected antioxidant activity, and which are relatively nonvolatile. They exhibit a high degree of protection for rubber against sunchecking and against atmospheric oxygen. They are derived from cheap raw materials and hence possess an economic advantage over most antioxidants of this general class.

In the practice of this invention it has been discovered that phenolic antioxidants having all of the positions ortho and para to the hydroxyl group filled with either tertiary butyl radicals or aralkyl radicals derived from styrene or vinyl toluene exhibit unusual antioxidant activity in the protection of rubbers. In particular, those compositions having two positions substituted with tertiary butyl and one position substituted with an aralkyl radical have exhibited the greatest antioxidant activity.

The compositions of this invention can be prepared by reacting phenol with a material selected from the group consisting of styrene and vinyl toluene and with isobutylene. In the preferred practice the unsubstituted phenol is reacted with the styrene or vinyl toluene first in order to have a substantial proportion of the available aralkyl radicals in the positions ortho and/or para to the hydroxyl group of the phenol. It has been discovered that usually only one aralkyl radical will attach and that seldom more than two will attach and that almost always attachment is in the ortho and para positions when two radicals do attach, leaving an ortho position available for further substitution. The product of this reaction is thereafter treated with isobutylene in order to complete trisubstitution of the ring positions ortho and para to the hydroxyl radical. This order of stepwise procedure is preferred although reversing the process steps provides desirable and effective antioxidant compostions.

In the customary practice of this invention the sum of the mols of reacting olefins is at least two and customarily three per mol of phenol. Although the conditions of reaction will vary a great deal, depending on the compostions being reacted and other factors such as pressure, the temperature will ordinarily be maintained within a range of 50° C. to 150° C. If the temperature is too high the customary alkylation catalysts may reverse their role and become catalysts for dealkylation.

In the practice of the invention, one or more of the customary acidic alkylation catalysts is used to activate and accelerate the reactions. For example, alkane sulfonic acids, sulfuric acid, benzene sulfonic acid, toluene sulfonic acid, activated clays, stannic chloride, ferrous chloride, boron tri-fluoride, zinc chloride, the ferrous and ferric halides, the stannous and stannic halides, aluminum halide and aluminum oxide will activate the reactions. Usually, concentrated sulfuric acid is used as the alkylation catalyst. The catalyst will ordinarily be used in an amount of at least 0.5% of the total weight of reactants in order to obtain proper action. Larger amounts of catalyst, for example up to 5.0% by weight of the reactants, are satisfactory.

The new compositions of this invention are further defined with reference to the following structural formula

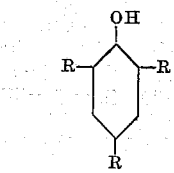

in which each R represents a tertiary butyl radical or an aralkyl radical selected from the group consisting of alphaphenylethyl and alphatolylethyl radicals, there being at least one tertiary butyl radical present and at least one aralkyl radical present and there being at least one tertiary butyl radical in the ortho position to the hydroxyl group.

The compositions of this invention are thus phenolic compositions having at least one tertiary butyl radical ortho to the hydroxyl radical. The remaining ortho and the para positions may both contain aralkyl radicals or they may have one aralkyl and one tertiary butyl radical but they should never have two tertiary butyl groups. These compositions have displayed unusual and unexpected antioxidant activity.

Although this invention has been described with reference to pure compositions, it can be readily appreciated that mixtures of the compositions described herein might contain a very small proportion of phenolic compositions which may be tri-substituted in the ortho and para positions with the same radical or which may contain some meta substitution. Also, a small proportion of the reaction products may have only di-substitution. Although these compositions may not be desirable as antioxidants, they do not in any way inhibit the activity of the more desired compositions and for that reason isolation of the pure compounds is not necessary and is of course undesirable from the standpoint of economy.

The invention can further be illustrated by the following examples which are not intended as limitations:

EXAMPLE 1

One hundred and eighty-eight grams of phenol and 4 grams of concentrated sulfuric acid were heated to about 80° C. and thereafter 208 grams of styrene were added while the temperature was maintained between 80 and 100° C. After the addition of the styrene, 224 grams of isobutylene were added to the reaction product. This gave a molar relationship of 1:1:2, thus insuring a substantial proportion of ditertiarybutyl-alphaphenyl-ethyl phenol.

EXAMPLE 2

One hundred and eighty-eight grams of phenol and 4 grams of concentrated sulfuric acid were heated to about 80° C. and thereafter 224 grams of isobutylene were added while the temperature was maintained between 80 and 100° C. After the addition of the isobutylene, 208 grams of styrene were added to the reaction product. This provided a molar relationship of 1:2:1, again insuring a substantial proportion of ditertiarybutyl-alphaphenylethyl phenol.

EXAMPLE 3

Two hundred and six grams of 2,4-ditertiarybutyl phenol and 1 gram of concentrated sulfuric acid were warmed to about 60° C. and thereafter 104 grams of styrene were slowly added. After the reaction was completed the catalyst was destroyed by neutralization and pure 2,4-ditertiarybutyl-6-alphaphenylethyl phenol was vacuum distilled from the reaction system, providing 206.0 grams of phenolic composition having a boiling point between 155 and 158° C. at 3 millimeters' pressure.

EXAMPLE 4

One hundred and ninety-eight grams of 4-alphaphenylethyl phenol and 4 grams of concentrated sulfuric acid were warmed to 85° C. and thereafter 112 grams of isobutylene were added while the temperature was kept between 80 and 85° C. After the reaction was completed, the catalyst was destroyed by neutralization and 247.0 grams of 2,6-ditertiarybutyl-4-alphaphenylethyl phenol were vacuum distilled off, this product having a boiling point between 180 and 183° C. at 5 millimeters' pressure.

The products of this invention have been tested for antioxidant activity in the following formulation:

| | |
|---|---|
| Extracted pale crepe | 100 |
| Zinc oxide | 5 |
| Sulfur | 3 |
| Hexamethylene tetramine | 1 |
| Stearic acid | 1.5 |
| Antioxidant | 1.0 |

The antioxidant efficiency was measured by aging 18 days in an oxygen bomb at 50° C. and at a pressure of 150 pounds per square inch. Antioxidant activity was measured by the percent of tensile retention and weight increase as shown in the following table:

TABLE 1

| Cure—50 minutes at 285° F. | Percent Tensile Retention, 18 days | Percent Weight Increase, 18 days |
|---|---|---|
| Control—No antioxidant | 0 | 18.7 |
| R.P.phenol:isobutylene:styrene—1:1:1 | 45.0 | 1.07 |
| R.P.phenol:isobutylene:styrene—1:1.5:1 | 53.3 | 0.90 |
| R.P.phenol:isobutylene:styrene—1:1:1.5 | 43.4 | 1.14 |
| R.P.p-alphaphenylethyl phenol and isobutylene (1:2) | 71.8 | 0.18 |
| R.P.p-alphaphenylethyl phenol and isobutylene (1:1) | 79.4 | 0.18 |
| R.P.o-alphaphenylethyl phenol and isobutylene (1:1) | 77.8 | 0.22 |

R.P. means reaction product.

The antioxidants of this invention were also tested in raw GR–S polymer.

One and twenty-five hundredths percent antioxidant was added to a 75–25 butadiene-styrene polymer. A thin film of the protected rubber was placed in an oxygen absorption apparatus at 80° C. and the rate of oxygen absorption measured. The time required to reach 1% and 2% oxygen absorption is found below:

TABLE 2

Aging data—oxygen absorption

| Antioxidant | Hours to Absorb Percent Oxygen | | Percent Improvement over Control | |
|---|---|---|---|---|
| | 1% | 2% | at 1% | at 2% |
| Antioxidant A [1] | 71 | 160 | | |
| R.P.phenol:styrene:isobutylene 1:2:0.5 | 81 | 185 | 14 | 15 |
| R.P.phenol:styrene:isobutylene 1:1.5:0.5 | 92 | 200 | 30 | 25 |
| R.P.phenol:styrene:isobutylene 1:1:1 | 120 | 230 | 70 | 44 |
| R.P.phenol:styrene:isobutylene 1:1:1.5 | 127 | 250 | 81 | 56 |
| R.P.phenol:styrene:isobutylene 1:1:2 | 132 | 285 | 86 | 78 |

[1] Antioxidant A is a commercial mixture of alkylated phenols.

Further tests were conducted to establish that the products of the invention are nonstaining and nondiscoloring. Representative products of the invention were compounded in a white rubber formula containing natural rubber, sulfur, zinc oxide, calcium carbonate, stearic acid and antioxidant in the relationship of 1 part antioxidant to 100 parts natural rubber. These samples, plus two samples containing commercial antioxidants and one sample with no antioxidant, were exposed in a Weatherometer for 48 hours. The following table summarizes the results by a comparison rating:

TABLE 3

| Antioxidant | Discoloration, 48 hours in Weatherometer | Discoloration, 60 days' exposure on roof |
|---|---|---|
| No antioxidant | None | None. |
| Antioxidant A [1] | Very slight | Do. |
| Antioxidant B [2] | Light brown | Light brown. |
| Antioxidant C [3] | Light tan | Light tan. |
| R.P.phenol:styrene:isobutylene 1:1:1.5 | Very slight | None. |
| R.P.phenol:styrene:isobutylene 1:1.5:0.5 | do | Do. |
| R.P.phenol:styrene:isobutylene 1:1:2 | do | Do. |
| R.P.phenol:styrene:isobutylene 1:1:1 | do | Do. |
| R.P.phenol:styrene:isobutylene 1:2:0.5 | do | Do. |
| R.P.phenol:isobutylene:styrene 1:1:1 | do | Do. |
| R.P.phenol:isobutylene:styrene 1:1.5:1 | do | Do. |
| R.P.phenol:isobutylene:styrene 1:2:1 | do | Do. |

[1] Antioxidant A is a commercial mixture of alkylated phenols.
[2] Antioxidant B is a commercial mixture of alkylated diphenylamines.
[3] Antioxidant C is a commercial mixture of alkylated bis-phenols.

The products of the invention are useful as age resistors in both vulcanized and raw rubber and both uses are contemplated within the scope of the specification and claims.

Use of the term "an oxidizable rubber" is intended to include rubbers subject to atmospheric oxidation such as diene polymers, which include natural rubber and the various synthetic rubbers and rubber-like materials which are similar from the standpoint of aging, e.g. polychloroprene, the polymerization products of a major proportion of a mono-olefin, such as isobutylene, and a minor proportion of a poly-olefin, such as butadiene or isoprene, the rubbery copolymers of butadiene and styrene and the rubbery copolymers of butadiene and acrylonitrile and the like. The antioxidants of this invention are used in a rubber in the customary effective antioxidant amount, e.g., from about 0.5% by weight to about 5.0% by weight, based on the weight of the rubber.

This application is a division of copending application, Serial No. 491,783, filed March 2, 1955, now abandoned.

While certain representative embodiments and details have been shown for the purpose of illustrating the invention, it will be apparent to those skilled in this art that various changes and modifications may be made therein without departing from the spirit or scope of the invention.

I claim:
1. An oxidizable rubbery polymer of a conjugated diolefin containing from 0.5 to 5.0% by weight of a phenolic antioxidant having the following structural formula

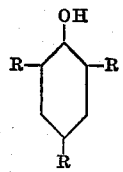

wherein each R is selected from the group consisting of tertiary butyl radicals and aralkyl radicals selected from the group consisting of alphaphenylethyl and alphatolylethyl radicals, there being at least one tertiary butyl radical attached to the phenolic ring and at least one aralkyl radical attached to the phenolic ring and there being at least one tertiary butyl radical in the ortho position to the hydroxyl radical.

2. The composition according to claim 1 wherein the phenolic antioxidant is 2,4-ditertiary butyl-6-alphaphenylethyl phenol.

3. The composition according to claim 1 wherein the phenolic antioxidant is 2,6-ditertiary butyl-4-alphaphenylethyl phenol.

4. The composition according to claim 1 wherein the phenolic antioxidant is 2,4-ditertiary butyl-6-alphatolylethyl phenol.

5. The composition according to claim 1 wherein the phenolic antioxidant is 2,6-ditertiary butyl-4-alphatolylethyl phenol.

6. A composition comprising an oxidizable rubbery polymer of a conjugated diolefin selected from the group consisting of natural rubber, polychloroprene, the copolymers of isobutylene with butadiene, the copolymers of butadiene with isoprene, the copolymers of butadiene with styrene, and the rubbery copolymers of butadiene with acrylonitrile containing from 0.5 to 5.0% by weight of a phenolic antioxidant having the following structural formula

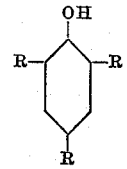

wherein each R is selected from the group consisting of tertiary butyl radicals and aralkyl radicals selected from the group consisting of alphaphenylethyl and alphatolylethyl radicals, there being at least one tertiary butyl radical attached to the phenolic ring and at least one aralkyl radical attached to the phenolic ring and there being at least one tertiary butyl radical in the ortho position to the hydroxyl radical.

7. The composition according to claim 6 wherein the phenolic antioxidant is 2,4-ditertiary butyl-6-alphaphenylethyl phenol.

8. The composition according to claim 6 wherein the phenolic antioxidant is 2,6-ditertiary butyl-4-alphaphenylethyl phenol.

9. The composition according to claim 6 wherein the phenolic antioxidant is 2,4-ditertiary butyl-6-alphatolylethyl phenol.

10. The composition according to claim 6 wherein the phenolic antioxidant is 2,6-ditertiary butyl-4-alphatolylethyl phenol.

References Cited in the file of this patent
UNITED STATES PATENTS

| | | |
|---|---|---|
| 2,248,831 | Stillson | July 8, 1941 |
| 2,471,887 | Nelson | May 31, 1949 |